United States Patent [19]

Rosenbaum

[11] Patent Number: 4,484,032
[45] Date of Patent: Nov. 20, 1984

[54] ACTIVE IMPEDANCE TRANSFORMER ASSISTED LINE FEED CIRCUIT

[75] Inventor: Stanley D. Rosenbaum, Ottawa, Canada

[73] Assignee: Northern Telecom Limited, Montreal, Canada

[21] Appl. No.: 406,115

[22] Filed: Aug. 6, 1982

[30] Foreign Application Priority Data

Jun. 7, 1982 [CA] Canada .................................. 404561

[51] Int. Cl.³ ...................... H04M 1/76; H04M 19/00
[52] U.S. Cl. ............................ 179/18 FA; 179/16 F; 179/70
[58] Field of Search ................ 179/18 FA, 170 D, 80, 179/78 R, 77, 70, 16 F

[56] References Cited

U.S. PATENT DOCUMENTS

| | | | |
|---|---|---|---|
| 3,955,052 | 5/1976 | Orbach | 179/18 FA |
| 4,087,647 | 5/1978 | Embree et al. | 179/77 |
| 4,110,636 | 8/1978 | Dijkmans | 307/237 |
| 4,433,213 | 2/1984 | Albers et al. | 179/18 FA |

FOREIGN PATENT DOCUMENTS 542358 3/1977 U.S.S.R. ................................ 179/77

Primary Examiner—Thomas W. Brown
Attorney, Agent, or Firm—J. E. Moorhouse

[57] ABSTRACT

A transformer assisted active impedance line circuit includes a transformer of reduced size as compared to both conventional and d.c. flux reduced transformer line circuits. The transformer has tip and ring primary windings consisting of equal turns and a secondary winding. Tip and ring amplifier circuits each have an output coupled to tip and ring terminals via tip and ring feed resistors which are connected in series with the tip and ring primary windings respectively. A direct current flow, out of the output of one of the amplifier circuits and into the output of the other of the amplifier circuits via two wire communication line connected to the tip and ring terminals, is of an aiding flux-generating effect in the transformer. The secondary winding is terminated by an impedance and provides a.c. signals to which the tip and ring amplifier circuits are responsive to reduce a.c. voice signal current components in the communication line.

13 Claims, 3 Drawing Figures

ACTIVE IMPEDANCE TRANSFORMER ASSISTED LINE FEED CIRCUIT

FIELD OF THE INVENTION

The invention relates to line interface apparatus for coupling a communication line with a communication system. More particularly, the invention is a line circuit having a transformer in combination with active impedance circuits.

BACKGROUND OF THE INVENTION

Telephone loops which are associated with a central office (CO) telephone facility are usually terminated at the CO by a line circuit. The line circuit is typically required to provide a terminating impedance of about 900 ohms for voice frequency signals on the loop. The line circuit is also required to supply energizing direct current for operation of the loop. However the source impedance of the energizing direct current is usually required to be about 400 ohms. This is typically arranged for by two similar resistors of about 200 ohms, each being connected in series with one of the tip and ring leads of the loop and a CO battery of about 50 volts. The line circuit usually must meet stringent requirements as to permissible levels of unbalance to ground, for example less than −60 decibels, and tolerance of longitudinal induction of up to 20 milliamperes rms per lead. The line circuit must also be able to survive high voltage surges of at least 500 volts without damage to itself or apparatus in the CO. All of these requirements are well satisfied by many prior line interface circuits. However, many attempts have been made to design line circuits of lesser cost through reducing the bulk of various circuit components and by utilizing newer devices including semiconductor components to replace the transformer. Many of these attempts involve penalties such as requirements for battery voltage boosters, or failure to meet all of the typical line interface circuit operational requirements, or are not yet cost competitive with present widely used line interface circuits.

SUMMARY OF THE INVENTION

A line circuit in accordance with the invention includes active impedance tip and ring feed devices in combination with a transformer through which d.c. energizing current is supplied to a communication line and across which a.c. signals are coupled from the communication line. In contrast to a transformer as typically required to construct a line circuit, for example as described in V. V. Korsky in U.S. Pat. No. 4,103,112 issued on July 25, 1978, a transformer of lesser bulk and cost is suitable for use in the present invention.

The invention provides a line circuit for terminating a two wire communication line. The line circuit includes a transformer having tip and ring primary windings and a secondary winding. The primary windings each consist of n turns. Tip and ring terminals provide for connection of the communication line with the tip and ring primary windings respectively, such that a direct loop current flow by way of the primary windings, the tip and ring terminals and the communication line, is of an aiding flux-generating effect in the transformer. An active feed impedance is provided by a tip amplifier circuit having an output connected to the tip terminal via a series arrangement of a tip feed resistor and the tip primary winding. Another active feed impedance is provided by a ring amplifier circuit having an output similarly connected to the ring terminal via a series arrangement of a ring feed resistor and the ring primary winding. An impedance is connected across the secondary winding. In operation, the tip and ring amplifier circuits are responsive to a.c. signals being induced in the secondary winding to reduce a.c. voice signal current components in the communication line.

The invention also provides a method for supplying energizing current to a two wire communication line. In the method, direct current feed voltages are applied via tip and ring feed resistors of similar ohmic values, to the communication line. First voltage signals corresponding to current flows in the tip and ring feed resistors are derived and used to adjust potentials of the direct current feed voltages to effect a reduction of an average potential difference between the applied direct current feed voltages. A second voltage signal corresponding to a.c. differential current components, in a voice band range of frequencies, flowing in the tip and ring feed resistors is inductively derived and used to vary the respective direct current feed voltages in antiphase with the a.c. current components flowing in the respective tip and ring feed resistors whereby the magnitudes of said a.c. differential current components are reduced.

BRIEF DESCRIPTION OF THE DRAWINGS

Example embodiments are described in the following with reference to the accompanying drawings in which.

DESCRIPTION OF THE EXAMPLE EMBODIMENT

Figure 1:
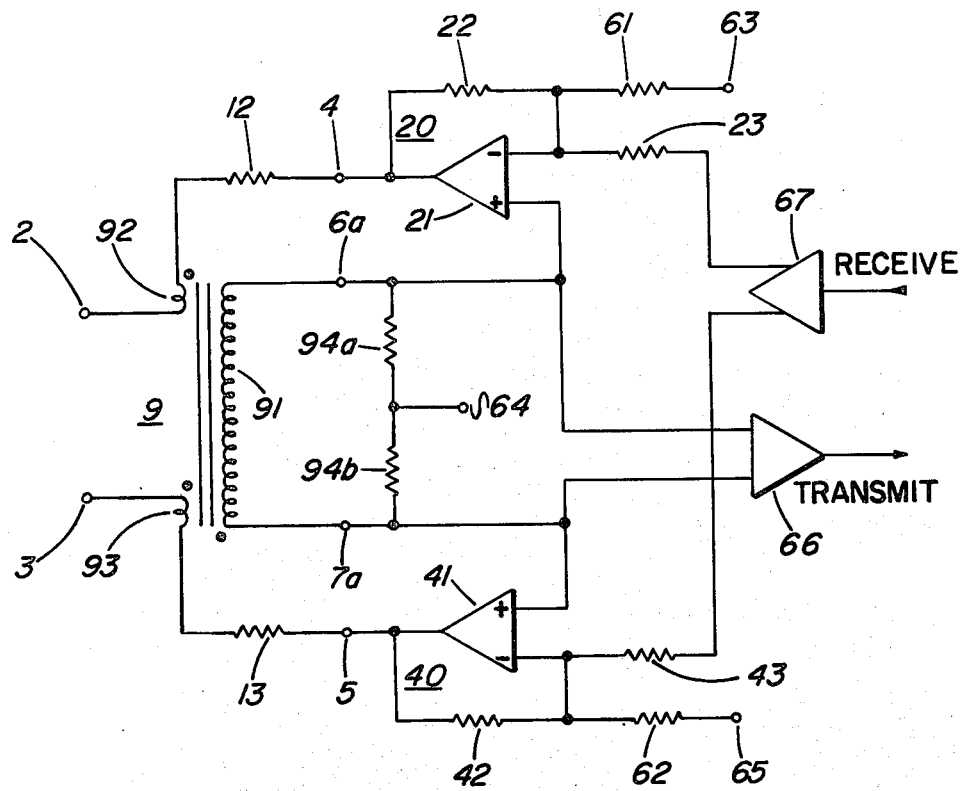
FIG. 1 is a schematic diagram of a line circuit in accordance with the invention.

Referring to FIG. 1, tip and ring voltage amplifiers at 20 and 40 include differential amplifiers 21 and 41 having outputs connected to terminals 4 and 5 respectively. The differential amplifiers 21 and 41 are each separately provided with local negative feedback by resistors 22 and 42 so that low impedances are presented at the outputs of the differential amplifiers, in a frequency range of from zero hertz through at least the voice band. Tip and ring terminals 2 and 3 provide for connection of a telephone line. A transformer 9 includes first and second primary windings 92 and 93. The first primary winding 92 is connected in series between the tip terminal 2 and the terminal 4 via a tip feed resistor 12. The ring primary winding 93 is connected in series between the ring terminal 3 and the terminal 5 via a ring feed resistor 13. The tip and ring feed resistors 12 and 13 are substantially matched and are of ohmic values suitable to provide a preferred d.c. energizing current through the telephone line with preferred d.c. voltage levels being present at the terminals 4 and 5. Typically, the sum of the ohmic values of the resistors 12 and 13 is about 400 ohms or less, when a conventional telephone line of up to 2,000 ohms resistance is to be operated from a standard −50 volt CO battery.

The value of 400 ohms or less is too low by itself to provide a suitable a.c. termination for voice frequency signals on the telephone line. The value of the termination for voice frequency signals is usually required to be about 900 ohms. In order to provide a suitable a.c. termination impedance for the telephone line, the transformer 9 includes a secondary winding 91, having a much larger number of turns than the sum of the turns in the primary windings 92 and 93. Resistors 94a and 94b, of similar ohmic values, are connected in series across the secondary winding 91, via the terminals 6a and 7a, to provide a substantially predetermined impedance termination. A junction of the resistors 94a and 94b is connected to a bias terminal 64. The ohmic values of the resistors 94a and 94b are chosen so that a voltage (VD), induced across the secondary winding 91 as a result of voice frequency line currents, is substantially flat with respect to frequency. This voltage VD can be calculated from the following equation:

$$VD = iTR\ RD\ n/m$$

where iTR is the voice frequency component of the telephone line current, RD is the sum of the ohmic values of the resistors 94a and 94b, n is the sum of the turns in the primary windings 92 and 93, and m is the number of turns in the secondary winding 91. If for example the inductance of the secondary winding is about 1 Henry, a typical value of RD lies in a range of about 10 to 1000 ohms. In this arrangement, the voltage induced in the secondary winding 91 is substantially independent of the transformer parameter tolerances other than that of turns ratio, which is easily controlled. Thus the voltage VC across the secondary winding 91 is an accurate representation of voice frequency current components in the telephone line current, in terms of RD. On the other hand, unwanted longitudinally induced noise signals on the telephone line are suppressed because of the cancellation effect of the equal number of turns on the primary windings 92 and 93. The voltage VD from the secondary winding 91 is applied via the terminals 6a and 7a to non-inverting inputs of the differential amplifiers 21 and 41 respectively, and also across an a.c. differential input of an amplifier 66. Output signals from the amplifier 66 are coupled via a transmit lead for use in an associated telephone facility, not shown. Resistors 61 and 62 provide bias currents from bias terminals 63 and 65 to the inverting inputs of the tip and ring differential amplifiers 21 and 41 respectively. Appropriate bias potentials are applied at the bias terminals 63, 64 and 65 to provide the preferred average output potentials to cause a suitable energizing current to be conducted via the telephone line during an OFF HOOK condition. In one example bias voltages of about −50 volts, −25 volts and zero volts are applied at the bias terminals 63, 64 and 65 respectively. A phase splitting a.c. amplifier circuit 67 receives a.c. signals from the associated telephone facility via a receive lead, for propagation on the telephone line. These a.c. signals are supplied in antiphase to the inverting inputs of the differential amplifiers 21 and 41 via resistors 23 and 43 respectively.

The arrangement in FIG. 1 is but one example whereby the voltage VC is applied as feedback to the tip and ring amplifier circuits 20 and 40. As is shown from start winding dots associated with each of the windings 91, 92 and 93 in FIG. 1, the polarity of the feedback is such as to reduce the a.c. components of the telephone line current. This may also be expressed as an increase of a.c. termination impedance to a value above the d.c. resistance values of the tip and ring feed resistors 12 and 13 summed with the effective d.c. feed resistances of the tip and ring amplifier circuits 20 and 40. An effective value of the a.c. terminating impedance (ZTR) is approximately expressed by the following equation:

$$ZTR = RF + nRD(R1 + R2)/(mR1)$$

where: RF is the sum of the ohmic values of the feed resistors 12 and 13 and the effective direct current series resistances of the tip and ring amplifiers 20 and 40; R1 is the approximate ohmic value of each of the resistors 23 and 43; R2 is the approximate ohmic value of each of the resistors 22 and 42, and RD; n and m are as defined in relation to the previous equation.

Suitable values for achieving an effective value of 900 ohms for ZTR in the example embodiment in FIG. 1 are as follows:
  resistor 12 = 200 ohms
  resistor 13 = 200 ohms
  resistor 94a = 200 ohms
  resistor 94b = 200 ohms
  resistor 22 = 300 Kohms
  resistor 42 = 300 Kohms
  resistor 23 = 12 Kohms
  resistor 43 = 12 Kohms
  winding 91 = 640 turns
  winding 92 = 16 turns
  winding 93 = 16 turns A suitable core material for the transformer 9 is available from Siemens Electric Ltd., 7300 Trans-Canada Highway, Pointe Claire, Quebec, Canada H9R 1C7, under the identifying core code EP 10.

Figure 2:
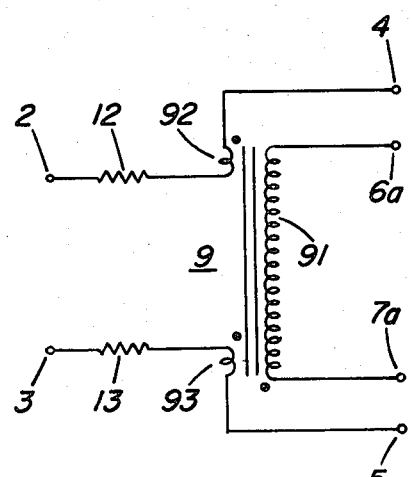
FIG. 2 is a schematic diagram of an alternate arrangement of part of the line circuit in FIGS. 1 and 3.

As is well known in the telephone industry, a line circuit may from time to time be exposed to a high voltage transient occurrence, typically as a result of a lightening strike or a power line cross on the associated telephone line. In practice a protection network, not shown in the figures, is normally connected across the terminals 2 and 3 or the terminals 4 and 5, or the junctions of the feed resistors 12 and 13 and the first and second primary windings 92 and 93. The purpose of the protection network is of course to provide an alternate path for currents associated with a high voltage transient occurrence such that components of the line circuit are less likely to be damaged. In FIG. 1 the transformer 9 is in a position where it is likely to be directly exposed to transients of up to a kilovolt. However this is of little consequence as standard production practices typically provide transformers with sufficient interwinding insulation to withstand such transient voltage occurrences. In the arrangement in FIG. 2, the line feed resistors 12 and 13 are connected in series between the respective tip and ring terminals 2 and 3 and the respective tip and ring primary windings 92 and 93. In this arrangement, the tip and ring feed resistors act to partially dissipate a high voltage transient, thus protecting the transformer 9. Hence in accordance with the arrangement in FIG. 2, the transformer 9 is more economically constructed if a correspondingly lesser insulation standard is required of the manufacturer. Except for this one difference, the function of the line circuits in the FIGS. 1 and 3 is essentially the same as herein described regardless of whether or not the alternate arrangement in FIG. 2 is used.

Figure 3:
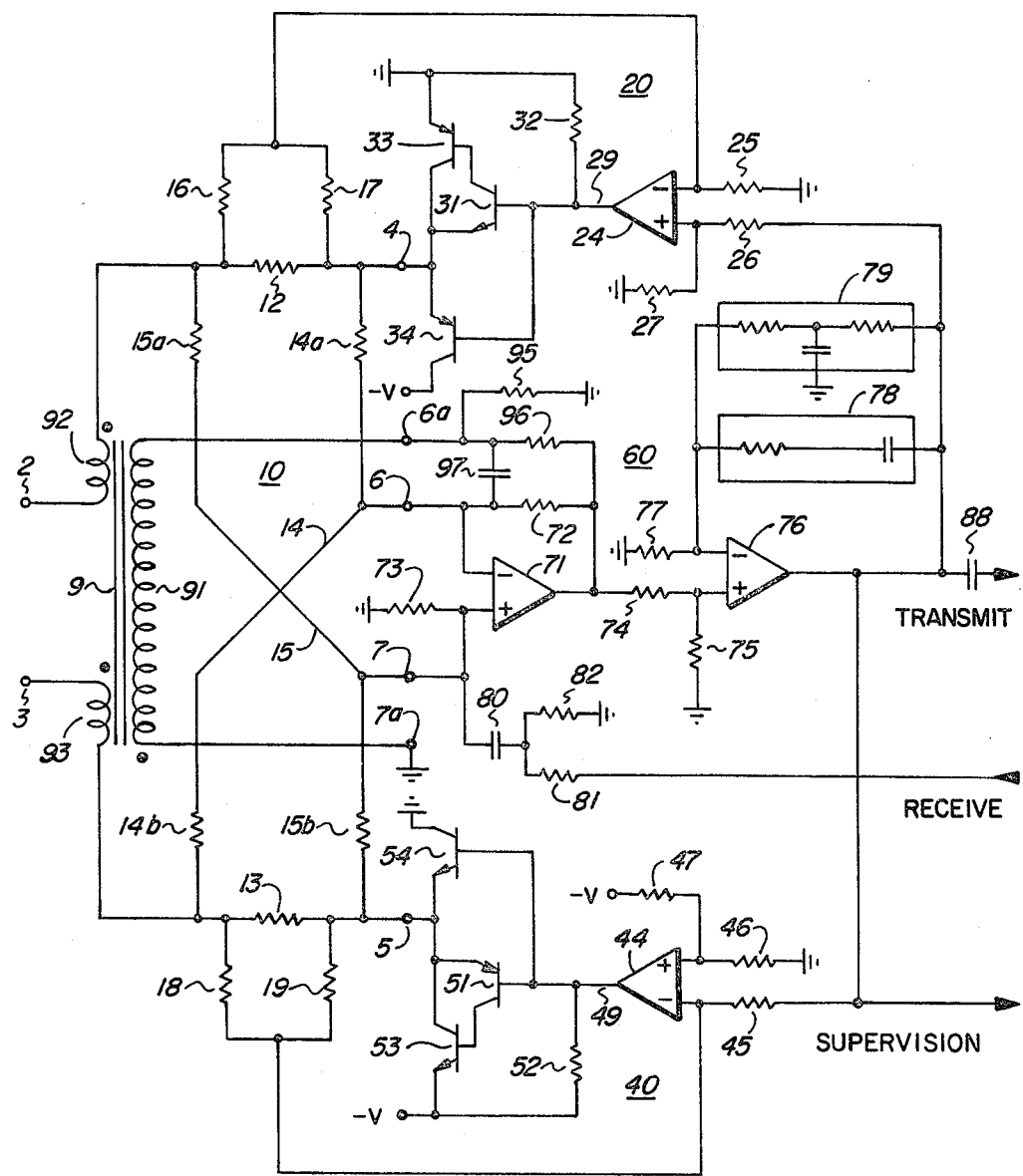
FIG. 3 is a schematic diagram of an alternate embodiment of a line circuit in accordance with the invention.

The line circuit in FIG. 3 provides the following operational features: power feed to a telephone line from a controlled resistance source; independent a.c. termination impedance; balanced voice signal pickup from the telephone line; balanced voice signal drive to the telephone line; suppression of longitudinal interference from voice signals; tolerance of high longitudinal induced currents; and a supervision signal indicative of a subscriber station set hook switch status (OFF HOOK, dial pulsing, and ON HOOK).

Many of the elements in the line circuit in FIG. 3 are similar to the elements in the line circuit in FIG. 1 and are identified with corresponding labels. The line circuit in FIG. 3 is intended for use with a telephone facility or the like, having a central battery with −V and ground terminals.

In FIG. 3, a resistance network at 10 includes the tip and ring feed resistors 12 and 13 in combination with tip and ring voltage dividers 14 and 15. The tip and ring voltage dividers 14 and 15 are provided by resistors 14a and 14b, and by resistors 15a and 15b, connected as shown to define respective tip and ring voltage taps 6 and 7. The resistance network at 10 provides a broad band signal path between the tip and ring feed resistors 12 and 13 and a control circuit at 60. A tip feedback network includes resistors 16 and 17 and is connected across the tip feed resistor 12. A junction of the resistors 16 and 17 is connected to an inverting input of a differential amplifier 24 in a tip amplifier circuit at 20. A ring feedback network includes resistors 18 and 19 and is connected across the ring feed resistor 13. A junction of the resistors 18 and 19 is connected to an inverting input of a differential amplifier 44 in a ring amplifier circuit at 40.

In the tip amplifier circuit at 20 a resistor 25 is connected between the inverting input of the differential amplifier 24 and ground, and a resistor 27 is connected between a non inverting input of the differential amplifier 24 and ground. An NPN transistor 31, and PNP transistors 33 and 34 are connected in combination as shown with a resistor 32 between −V and ground, and provide in operation a voltage follower function at the terminal 4 for voltage signals appearing at an output 29 of the differential amplifier 24.

In the ring amplifier circuit at 40, resistors 46 and 47 are connected in series between ground and −V, a junction of the resistors being connected to a non-inverting input of the differential amplifier 44. A PNP transistor 51, and NPN transistors 53 and 54 are connected in combination as shown with a resistor 52 between ground and −V, and provide in operation a voltage follower function at the terminal 5 for voltage signals appearing at an output 49 of the differential amplifier 44.

The control circuit at 60 is used to control operation of the tip and ring amplifier circuits at 20 and 40 to provide preferred d.c. source resistance and a.c. source impedance for the communication line, and to couple a.c. differential signals from a receive lead to the communication line. The control circuit also provides for coupling of a.c. differential signals present in the communication line to a transmit lead, and provides for coupling of supervisory states of the communication line to a supervision lead.

The control circuit is provided by differential amplifiers 71 and 76 and associated circuitry. The differential amplifier 71 includes inverting and non-inverting inputs connected to the tip and ring voltage taps 6 and 7. In the associated circuitry, a resistor 72 is connected between an output of the differential amplifier 71 and the inverting input and a resistor 96 and a capacitor 97 are connected in series across the resistor 72. A junction of the resistor 96 and the capacitor 97 is connected to the terminal 6a and a resistor 95 is connected between the terminal 6a and ground. A terminal 7a and the terminal 6a connect the secondary winding 91 to the control circuit. The terminal 7a is grounded such that a predetermined impedance termination is provided by the resistor 95 in combination with the associated circuitry. A resistor 73 is connected between ground and the non-inverting input of the differential amplifier 71, and a capacitor 80 and a resistor 82 are connected in series across the resistor 73. A junction of the capacitor 80 and the resistor 82 is connected via a resistor 81 to a receive lead. Resistors 74 and 75 are connected in series between the output of the differential amplifier 71 and ground. A junction of the resistors 74 and 75 is connected to a non-inverting input of the differential amplifier 76, and a resistor 77 is connected between an inverting input of the differential amplifier 76 and ground. The differential amplifier 76 includes an output connected to a supervision lead and coupled via a capacitor 88 to a transmit lead. The inverting input of the differential amplifier 76 is coupled with the output of the differential amplifier 76 via an a.c. feedback network 78, and via a d.c. feedback network 79. The output of the differential amplifier 76 is also coupled via a resistor 26 to the non-inverting input of the differential amplifier 24, and via a resistor 45 to the inverting input of the differential amplifier 44.

In operation, a two wire communication line is connected at the tip and ring terminals 2 and 3. Power is supplied from the −V and ground terminals. The control circuit at 60 is responsive to signals at the tip and ring terminals 2 and 3, and to signals on the receive lead for controlling the tip and ring voltage amplifiers at 20 and 40. The tip voltage amplifier at 20 in this example has a gain of about unity and is driven at its non-inverting input such that it functions as a level shifting voltage follower. The ring voltage amplifier at 40 in this example also has a gain of about unity, however it is driven at its inverting input such that it functions as a level shifting voltage inverter. A signal path for signals including direct current signals is provided by the resistance network 10. Signals corresponding to current flow in the two wire communication line are developed across the tip and ring feed resistors 12 and 13. These signals are coupled through the tip and ring voltage dividers 14 and 15 via the tip and ring voltage taps 6 and 7, to the inputs of the differential amplifier 71. Voice frequency signals from the resistor network 10 are attenuated at the inputs of the differential amplifier 71, as the resistor 96 is chosen to be of a substantially lesser ohmic value than is the resistor 72 and as the resistor 81 is likewise chosen to be of a substantially lesser ohmic value than the resistor 82. An a.c. signal path for a.c. signals having frequencies in a range extending through the voice band of frequencies is provided by the transformer 9. Alternating current signals corresponding to differential alternating current components in current flow in the two wire communication line are inductively coupled from between the primary windings 92 and 93 to secondary winding 91, and through the capacitor 97 to the inverting input of the differential amplifier 71. The combined effects of the differential amplifier 71, the resistor 72 and the capacitor 97, are to maintain substantially zero voltage virtual ground at the terminal 6a relative to the grounded terminal 7a, with inverted voltage signals corresponding to the alternating current signals from the secondary winding 91 appearing at the output of the differential amplifier 71.

A circuit path is completed via the two wire communication line, typically by a remote subscriber station set, not shown, being connected to the communication line and being in an OFF HOOK condition. In this event the differential amplifier 71 is responsive to a d.c. potential difference appearing across the tip and ring voltage taps 6 and 7, with an amount of gain as determined as a function of the ohmic values of the resistor 72 and the network 10, and with an offset as introduced by the resistor 73. The resulting output from the differential amplifier 71 is resistively coupled by the voltage divider provided by the resistors 74 and 75 to the differential amplifier 76. The differential amplifier 76 is responsive with a degree of gain with respect to lesser than voice band signal frequencies, as is substantially determined by the ohmic values of the d.c. feedback network 79 and the resistor 77, to generate an output signal. The output signal serves as d.c. indication of the supervisory state of the subscriber station set, for controlling the operation of the tip and ring voltage amplifiers at 20 and 40. Also, the effective d.c. source impedances at the terminals 4 and 5 are substantially controlled in accordance with the ohmic value of the d.c. feedback network 79. For typical communication lines, the effective d.c. source impedance in summation with the ohmic values of the feed resistors 12 and 13, is arranged to provide a d.c. feed resistance of about 400 ohms at the terminals 2 and 3. Also, a.c. signals for reception by the subscriber station set are coupled from the receive lead through the resistor 81 and the capacitor 80 to the non-inverting input of the differential amplifier 71.

In the OFF HOOK condition, the control circuit is required to be substantially non responsive to longitudinal signals on the communication line. The resistance network 10 couples substantially only differential signals, via the terminals 6 and 7, to the inputs of the differential amplifier 71. However, signals corresponding to differential a.c. components flowing in the communication line are primarily coupled to the differential amplifier 71 from the transformer 9, via the terminals 6a and 7a, rather than from the resistance network 10. This effectively enhances the overall common mode rejection performance of the control circuit 60. Any longitudinal alternating current components present in the current flow in the two wire communication line are substantially isolated from the inputs of the differential amplifier 71 by virtue of the primary windings 92 and 93 being closely controlled in manufacture to have equal numbers of turns. Hence the component values of the feed resistors 12 and 13 need only be within one percent of a specified value, and similarly component values of the resistors 14a, 14b, 15a and 15b need only be within one percent of a specified value.

The differential amplifier 76 responds to a.c. signal components from the output of the differential amplifier 71 substantially as determined by the impedance of the a.c. feedback network at 78 and the resistance of the resistor 77. Alternating current signal components are coupled to the transmit lead via the capacitor 88, and include a.c. signals generated in the remote subscriber station set as well as a.c. signals from the receive lead which are destined for the remote subscriber station set. The same alternating current signals are coupled to the respective inputs of the tip and ring voltage amplifier circuits at 20 and 40. These amplifiers operate in combination with the differential amplifier 76 to have an effective a.c. output impedance which is substantially controlled in accordance with the impedance of the a.c. feedback network 78. Hence the effective a.c. source impedance at the tip and ring terminals 2 and 3 is controlled with a substantial degree of independence with respect to the effective d.c. source resistance. For typical communication lines the a.c. source impedance of the tip and ring amplifier circuits at 20 and 40 in summation with the ohmic values of the feed resistors 12 and 13 is arranged to be about 950 ohms at the tip and ring terminals 2 and 3.

Variation of the line circuits in the figures and within the scope of the invention will become apparent to persons skilled in this art. In any embodiment of the invention it is of course recommended that in cases where the communication line may be exposed to high voltages, that adequate protection circuitry be connected at the line side of the line circuit.

What is claimed is:

1. A line circuit for terminating a two wire communication line comprising:
    a transformer having tip and ring primary windings and a secondary winding, the primary windings each consisting of n turns and the secondary winding consisting of more than 2 n turns;
    tip and ring terminals for connecting the communication line with the tip and ring primary windings respectively, such that a direct loop current flow via the primary windings and the communication line, is of an aiding flux-generating effect in the transformer, whereby a narrow-band signal path is provided by the secondary winding for differential a.c. signal components of current flows in the primary windings;
    tip and ring feed resistors;
    a tip amplifier circuit having an output connected to the tip terminal via a series arrangement of the tip feed resistor and the tip primary winding;
    a ring amplifier circuit having an output connected to the ring terminal via a series arrangement of the ring feed resistor and the ring primary winding remote from the ring terminal; and
    the tip and ring amplifier circuits being connected to be responsive in operation to signals induced in the secondary winding for reducing the magnitudes of corresponding signal components in the primary windings.

2. A line circuit as defined in claim 1 further comprising a pair of resistors being of similar ohmic values and being connected in series across the secondary winding, the resistors defining a junction therebetween for application of a bias voltage thereto, whereby effective a.c. source impedances at the outputs of the tip and ring amplifier circuits are substantially predetermined as a function of the sum of the ohmic values of the pair of resistors.

3. A line circuit as defined in claim 2 wherein the tip and ring amplifier circuits each comprise:
    an amplifier having inverting and non-inverting inputs, the inverting input being connected via a resistor to the output of the amplifier circuit, and in the tip amplifier circuit the non-inverting input being a.c. coupled to a first end of the secondary winding, and in the ring amplifier circuit the non-inverting input being connected to a second end of the secondary winding;
    the line circuit further comprising means for conducting bias currents to each of the amplifier circuits for causing one and the other amplifier circuits to have average output potentials being removed from respective terminal potentials of an energizing power source by an amount of at least half of the peak to peak potential of the largest a.c. voice band signal for propagation along the communication line.

4. A line circuit as defined in claim 1 further comprising at least one passive circuit element being connected in combination with the secondary winding for terminating the secondary winding with a substantially predetermined impedance value, whereby effective a.c. source impedances at the outputs of the tip and ring amplifier circuits are substantially predetermined.

5. A line circuit as defined in claim 4 wherein the tip and ring amplifier circuits each comprise:
an amplifier having inverting and non-inverting inputs, the inverting input being connected via a resistor to the output of the amplifier circuit, and in the tip amplifier circuit the non-inverting input being a.c. coupled to a first end of the secondary winding, and in the ring amplifier circuit the non-inverting input being connected to a second end of the secondary winding;
the line circuit further comprising means for conducting bias currents to each of the amplifier circuits for causing one and the other amplifier circuits to have average output potentials being removed from respective terminal potentials of an energizing power source by an amount of at least half of the peak to peak potential of the largest a.c. voice band signal for propagation along the communication line.

6. A line circuit as defined in claim 4 further comprising:
a resistance network being connected in combination with the tip and ring feed resistors and including tip and ring voltage taps for providing a signal path;
a resistor of predetermined ohmic value being connected across the secondary winding, and in combination with the transformer providing an a.c. signal path;
a control circuit including an output connected to an input of each of the tip and ring amplifier circuits and having inputs connected to said signal path and to said a.c. signal path, the control circuit being for controlling operations of the tip and ring amplifier circuits in response to signals from the signal path and the a.c. signal path.

7. A line circuit as defined in claim 6 wherein the control circuit comprises:
differential amplification means including a differential input being connected across the tip and ring voltage taps and being a.c. coupled to the secondary winding, an a.c. network for substantially defining an a.c. gain of the differential amplification means, and a d.c. network for substantially defining a d.c. gain of the differential amplification means, whereby source a.c. impedances and source d.c. resistances of the tip and ring amplifier circuits are governed as a function of the gain characteristics of the differential amplification means.

8. A line circuit as defined in claim 1 wherein the tip and ring amplifier circuits each include an inverting input, and the line circuit further comprises:
a tip feedback path including a resistor connected between the output and the inverting input of the tip amplifier circuit; and
a ring feedback path including a resistor connected between the output and the inverting input of the ring amplifier circuit.

9. A line circuit as defined in claim 1 wherein the tip and ring amplifier circuits each include an inverting input, and the line circuit further comprises:
a tip feedback path including a pair of resistors being connected in series across the tip feed resistor and defining a junction being connected to the inverting input of the tip amplifier circuit; and
a ring feedback path including a pair of resistors being connected in series across the ring feed resistor and defining a junction being connected to the inverting input of the ring amplifier circuit.

10. A line circuit as defined in claim 4 wherein the tip and ring amplifier circuits each include an inverting input, the line circuit further comprising:
a tip feedback path including first and second resistors of similar ohmic values connected in series across the tip feed resistor and defining a junction therebetween, the junction being connected to the inverting input of the tip amplifier circuit; and
a ring feedback path including first and second resistors of similar ohmic values connected in series across the tip feed resistor and defining a junction therebetween, the junction being connected to the inverting input of the ring amplifier circuit.

11. A line circuit as defined in any of claims 2, 3, 4, 5, 6, 7, 8, 9 and 10 in which the tip and ring feed resistors are directly connected to the outputs of the tip and ring amplifier circuits respectively.

12. A line circuit as defined in any of claims 2, 3, 4, 5, 6, 7, 8, 9 and 10 in which the tip and ring feed resistors are directly connected to the tip and ring terminals respectively.

13. A line circuit including tip and ring terminals for connection to a two wire communication line, tip and ring amplifiers having outputs connected in series with tip and ring feed resistors to the tip and ring feed terminals for supplying the communication line with energizing currents, the tip and ring resistors being of similar ohmic values, and a control circuit being differentially responsive to voltage signals corresponding to current flows in the tip and ring resistors for generating a voice band a.c. signal at an output thereof and for causing the tip and ring amplifiers to each have a selected effective output resistance and a selected effective a.c. output impedance, the line circuit being characterized by:
an a.c. signal path including inductive means for coupling voltage signals corresponding exclusively to differential alternating current components of the energizing currents to the control circuit.

* * * * *